(No Model.)
G. W. DEMAREE, H. O. SMITH & J. W. DITMARS.
TIRE TIGHTENER.
No. 534,497. Patented Feb. 19, 1895.
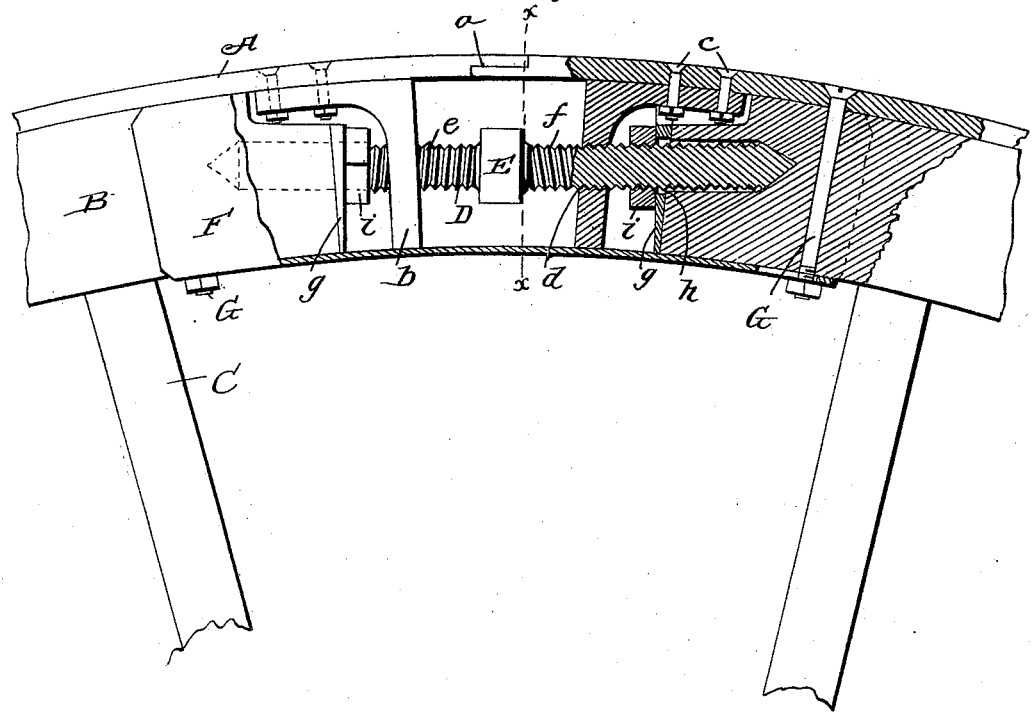
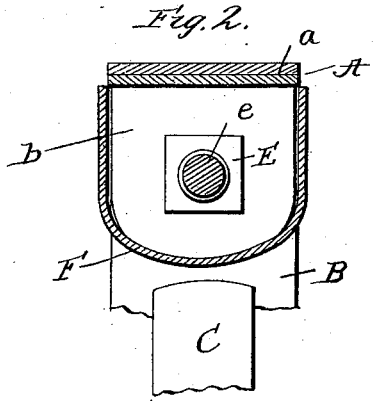

UNITED STATES PATENT OFFICE.

GEORGE W. DEMAREE, HERVEY O. SMITH, AND JOHN W. DITMARS, OF WHITELAND, INDIANA.

TIRE-TIGHTENER.

SPECIFICATION forming part of Letters Patent No. 534,497, dated February 19, 1895.

Application filed September 29, 1894. Serial No. 524,487. (No model.)

*To all whom it may concern:*

Be it known that we, GEORGE W. DEMAREE, HERVEY O. SMITH, and JOHN W. DITMARS, citizens of the United States, residing at Whiteland, in the county of Johnson and State of Indiana, have invented certain new and useful Improvements in Tire-Tighteners; and we do declare the following to be a full, clear, and exact description of the invention, such as will enable others skilled in the art to which it appertains to make and use the same.

Our invention relates to improvements in that class of tire tighteners which comprise a right and left threaded screw engaging the threaded apertures of lugs connected to the tire, and which are placed in and form a part of the wheel so that the tire may be tightened by any one without the necessity of removing the wheel from its axle or taking the vehicle to a blacksmith for the purpose; and its novelty will be fully understood from the following description and claim when taken in connection with the annexed drawings, in which—

Figure 1, is a view of a portion of a wheel partly in section and partly in elevation with our improvements, applied, and Fig. 2, is a cross, sectional view, taken at the point indicated by the dotted line $x$, $x$, on Fig. 1.

Referring by letter to said drawings:—A, indicates the tire, B, the felly, and C, the spokes of a wheel, which may be of any ordinary or approved construction.

The meeting ends of the tire are recessed as shown at $a$, so as to overlap each other, and in a new tire, these overlapping ends are designed to fit snugly, as shown; it being necessary when the tire has become stretched and loose upon the felly by wear, to file off the ends in order to allow the tire to be tightened, as will presently appear.

The tire is provided on its inner side near the overlapping ends, with two angle irons or brackets $b$. These brackets have one branch riveted or otherwise secured to the tire by rivets $c$, or the like, and the other branch of each bracket, is provided with a screw tapped aperture $d$, the aperture of one bracket having threads directed oppositely to that of the other, making one a right-hand thread and the other a left-hand thread.

D, indicates the tightening or adjusting screw. This screw is provided with a central enlargement E, which may be of an angular form to receive a wrench or other implement to turn it, or it may have holes to receive a lever. On one side of the central portion, the screw has right-hand threads $e$, and on the opposite side left-hand threads $f$, or vice-versa, and these threaded portions, respectively, take into the screw-threaded apertures of the angle-irons or brackets $b$, which are secured to the tire on opposite sides of the joint. The felly is cut away as shown so as to receive within the cut-away portion the brackets and the tightening or adjusting screw. The adjacent ends of the felly within this cut-away portion are also designed to receive the opposite ends of the screw, as shown, and a metallic plate $g$, is preferably placed on the exposed end of the felly with apertures $h$, for the passage of the screw. Nuts $i$, are also placed on the screw against the plates $g$, and have threads to engage those of the screw.

In operation, it will be seen that when the tire has become stretched or loosened by wear, and it is desirable to tighten the same, the meeting ends of the tire should first be filed off for a sufficient distance. Then by manipulating the screw, the brackets will be drawn toward each other, and with them, the tire, while the screw will, at the same time, hold the ends of the felly so that while the ends of the tire are being drawn together, the felly will be held and a thorough tightening will be the result.

The operative parts are all concealed from view and closed from dust, dirt, and the like by means of a plate F. This plate which closes over the felly may be secured to each end thereof by a bolt G, and the plate may have elongated slots so as to allow the tire and the felly to move without interrupting the plate or causing any binding action thereof.

By having the ends of the screw D, extended into the contiguous ends of the felly and provided with nuts $i$, which bear against the felly, the ends of the felly may be spread apart by simply turning the nuts $i$, and by turning said nuts in the opposite directions, the ends of the felly may be permitted to move toward each other, so as to loosen the tire when desirable.

Having described our invention, what we claim is—

In a tire tightener, the combination of the tire, the brackets secured thereto and having the threaded apertures, the felly having its ends separated, a right and left threaded screw interposed between the separated ends of the felly and extending into the same and also extending through the threaded apertures of the brackets on the tire, and nuts arranged on the screw and against the ends of the felly, substantially as and for the purpose set forth.

In testimony whereof we affix our signatures in presence of two witnesses.

GEORGE W. DEMAREE.
HERVEY O. SMITH.
JOHN W. DITMARS.

Witnesses:
HARRY TROUT,
CHAS. L. GRAHAM.